United States Patent
Rosing et al.

(10) Patent No.: US 8,850,360 B2
(45) Date of Patent: Sep. 30, 2014

(54) SKIPPING THROUGH ELECTRONIC CONTENT ON AN ELECTRONIC DEVICE

(75) Inventors: Dustin C Rosing, San Diego, CA (US);
Glenn A Wong, Foster City, CA (US);
Sam Hoang, Seattle, WA (US);
Matthew Wolfe, Seattle, WA (US)

(73) Assignee: Hewlett-Packard Development Company, L.P., Houton, TX (US)

(*) Notice: Subject to any disclaimer, the term of this patent is extended or adjusted under 35 U.S.C. 154(b) by 270 days.

(21) Appl. No.: 13/260,238

(22) PCT Filed: Feb. 23, 2010

(86) PCT No.: PCT/US2010/025063
§ 371 (c)(1),
(2), (4) Date: Sep. 23, 2011

(87) PCT Pub. No.: WO2011/105996
PCT Pub. Date: Sep. 1, 2011

(65) Prior Publication Data
US 2012/0023462 A1    Jan. 26, 2012

(51) Int. Cl.
*G06F 15/00* (2006.01)
*G06F 13/00* (2006.01)
*G06F 3/0488* (2013.01)
*G06F 3/0483* (2013.01)

(52) U.S. Cl.
CPC .......... *G06F 3/04883* (2013.01); *G06F 3/0483* (2013.01); *G09G 2380/14* (2013.01)
USPC .......................................... 715/838; 715/764

(58) Field of Classification Search
CPC ............................ G06F 3/04883; G06F 3/0483
USPC .................. 715/318, 838, 736, 782, 830, 863
See application file for complete search history.

(56) References Cited

U.S. PATENT DOCUMENTS

| | | | |
|---|---|---|---|
| 8,261,231 B1* | 9/2012 | Hirsch et al. | 717/100 |
| 8,291,344 B2* | 10/2012 | Chaudhri | 715/838 |
| 2006/0194181 A1 | 8/2006 | Rosenberg | |
| 2009/0174684 A1* | 7/2009 | Ryu et al. | 345/173 |
| 2009/0228901 A1* | 9/2009 | Beaver et al. | 719/318 |
| 2009/0237367 A1 | 9/2009 | Ryu et al. | |

FOREIGN PATENT DOCUMENTS

WO    WO-0206917 A2    1/2002

OTHER PUBLICATIONS

"The Future of Digital Reading—Submisslons : The OmniBook"; Oct. 14, 2009.
Mujcinovic, Mr. Nedzad; "LIVRE"; Monash University; Jul. 2008; 1 page.
PCT; "Notification of Transmittal of the International Search Report and the Written Opinion of the International Searching Authority, or the Declaration"; PCT/US2010/025063; Nov. 17, 2010; 9 pages.
Reisinger, Don; "Kindle is Not the Best Iphone E-Reader"; Mar. 6, 2009; 6 pages.

* cited by examiner

*Primary Examiner* — Kevin Nguyen

(57) ABSTRACT

Embodiments of the present invention disclose a method for skipping through electronic content displayed on an electronic device having a touchscreen display coupled to a processing engine. According to one embodiment, a multi-touch gesture is received from a user. Based on the user's multi-touch gesture, electronic content associated with digital media immediately advances to a subsequent section or immediately reverses back to a previous section of the digital media.

20 Claims, 5 Drawing Sheets

FIG. 4A
FIG. 4B

SKIPPING THROUGH ELECTRONIC CONTENT ON AN ELECTRONIC DEVICE

BACKGROUND

Touchscreen displays, which aid in simplifying the user experience by providing direct interaction between the user and the displayed content, are being utilized in more and more of today's electronic devices. In particular, electronic reading devices, or e-readers, are popular electronic touchscreen devices used for displaying electronic content of digital books or periodicals using electronic ink technology. Such devices make use of touch-based gestures from a user in order to facilitate on-screen control and navigation of electronic content. For example, a user may navigate through individual pages of a digital book by repeatedly swiping the touchscreen display with a single finger. However, due to the vast number of pages and sections in most digital books and periodicals, current touch-based navigation methods are inefficient for quickly navigating multiple pages and sections of electronic content or text.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 1A illustrates an exemplary operating environment for an all-in-one touchscreen computer in accordance with an embodiment of the present invention, while

FIGS. 4A and 4B illustrate a touch-based gesture for skipping back to a previous section of electronic content according to an embodiment of the present invention.

DETAILED DESCRIPTION OF THE INVENTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Touchscreen controls and touch-based gestures are commonly used to simplify and accelerate the input means for a user. These gestures and controls need to be intuitive and easy to remember for future use by the user. Generally, a single finger swipe is the pervasive method for navigating through individual pages of a digital book or digital periodical. Some methods utilize drop down menus for allowing a user to manually select a particular page or section of the electronic book or periodical. However, neither of these solutions enables a user to quickly and efficiently navigate multiple pages or sections of electronic content.

Embodiments of the present invention disclose a system and method for skipping through electronic content of an electronic touchscreen device. According to one embodiment, a multi-touch gesture is received from a user on the electronic touchscreen device. A processing engine associated with the electronic device causes the electronic content to immediately skip ahead to a next section or immediately skip back to a previous section based on the touchscreen gesture of the user. For example, a horizontal two-finger swipe of the touch screen display either from right to left, or from left to right, serves to advance the current chapter to the beginning of the next chapter, or reverse the current chapter to a previous chapter of an electronic book. Accordingly, embodiments of the present allow a user to immediately seek out a particular section of electronic content using a logical and efficient touchscreen gesture.

Figure 1A:
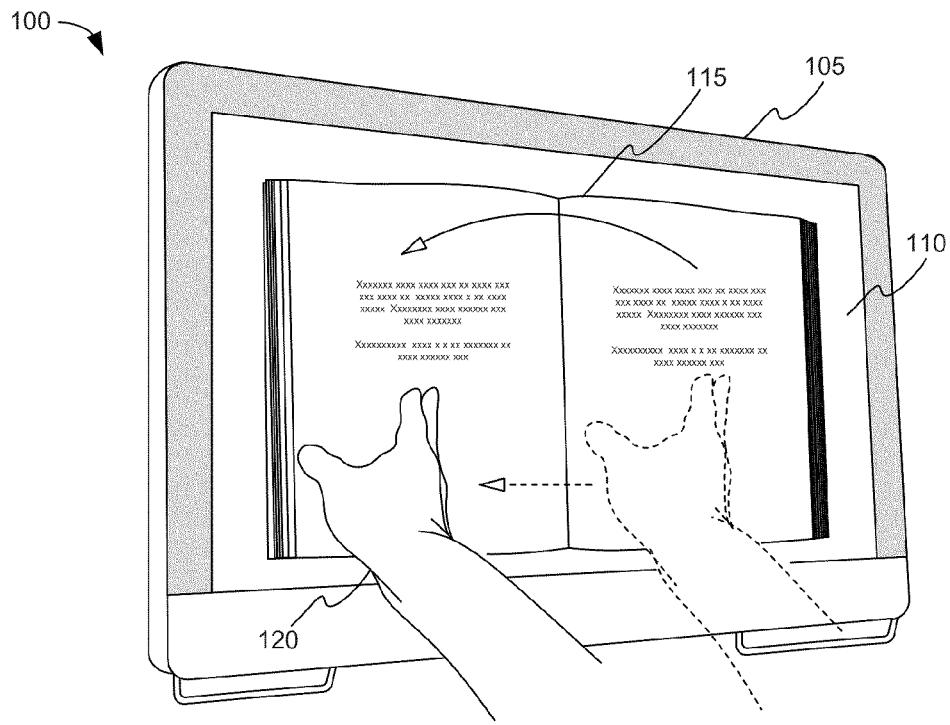
Figure 1B:
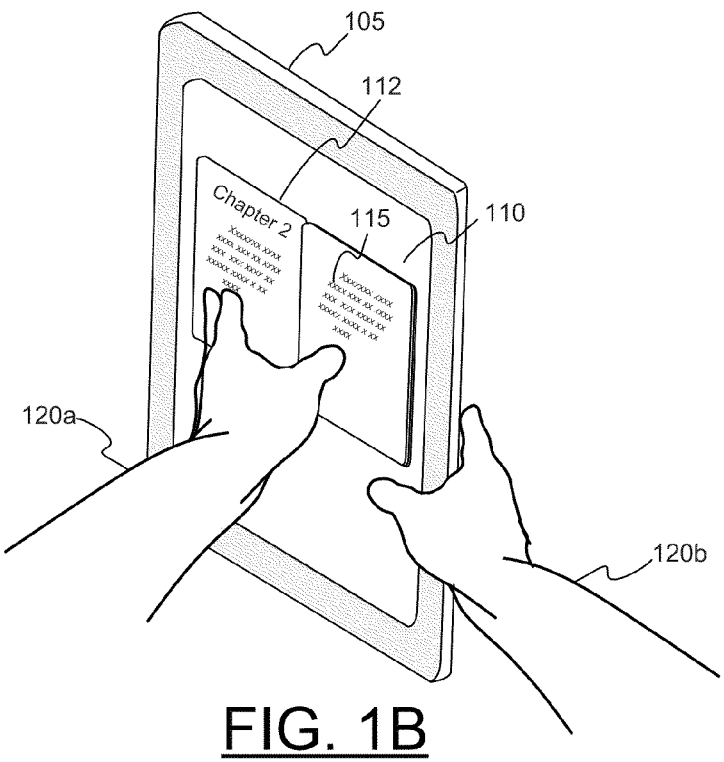
FIG. 1B illustrates an exemplary operating environment for an electronic reading device accordance with an embodiment of the present invention.

Referring now in more detail to the drawings in which like numerals identify corresponding parts throughout the views, FIG. 1A illustrates an exemplary operating environment for an all-in-one touchscreen computer in accordance with an embodiment of the present invention, while FIG. 1B illustrates an exemplary operating environment for an electronic reading device in accordance with an embodiment of the present invention. As shown in FIG. 1A, the electronic touchscreen device 100 includes a display enclosure 105 and a video display unit 110 configured to display digital media 115. Display unit 110 is a touchscreen display configured to detect the presence and location of a user's onscreen touch and may comprise of a resistive touchscreen panel, a capacitive touchscreen panel, an infrared touchscreen panel, or the like. The touchscreen device may be configured to detect a user's physical touch or a hover event, in which an object such as a finger or stylus is not physically touching the display device, but is in close proximity.

The touchscreen display unit 110 should at least be configured to accept and process limited forms of multi-touch, or multiple simultaneous touchpoints. Digital media may be any type of medium that includes electronic content or text such as a digital book, digital magazine, or digital newspaper for example. According to embodiments of the present invention, navigation through sections of the digital media 115 is accomplished via touchscreen gesture by a user's hand 120. As used herein, a section includes multiple pages of an article in an electronic magazine or electronic newspaper, or multiple pages of a chapter in an electronic book.

FIG. 1B illustrates another touchscreen environment for skipping through electronic content of an electronic touchscreen device. In this embodiment, an electronic reader represents the electronic touchscreen device 100. Like the embodiment shown in FIG. 1A, the electronic reader includes a display enclosure 105 and a display unit 110 configured to display digital media 112. While the electronic reader 100 is being held in one hand 120b of the user, the other hand 120a is free to use touch-based gestures to navigate the displayed electronic content 115. Accordingly, embodiments of the present invention provide an efficient one-hand method for skipping through electronic content of a touchscreen device.

Figure 2:
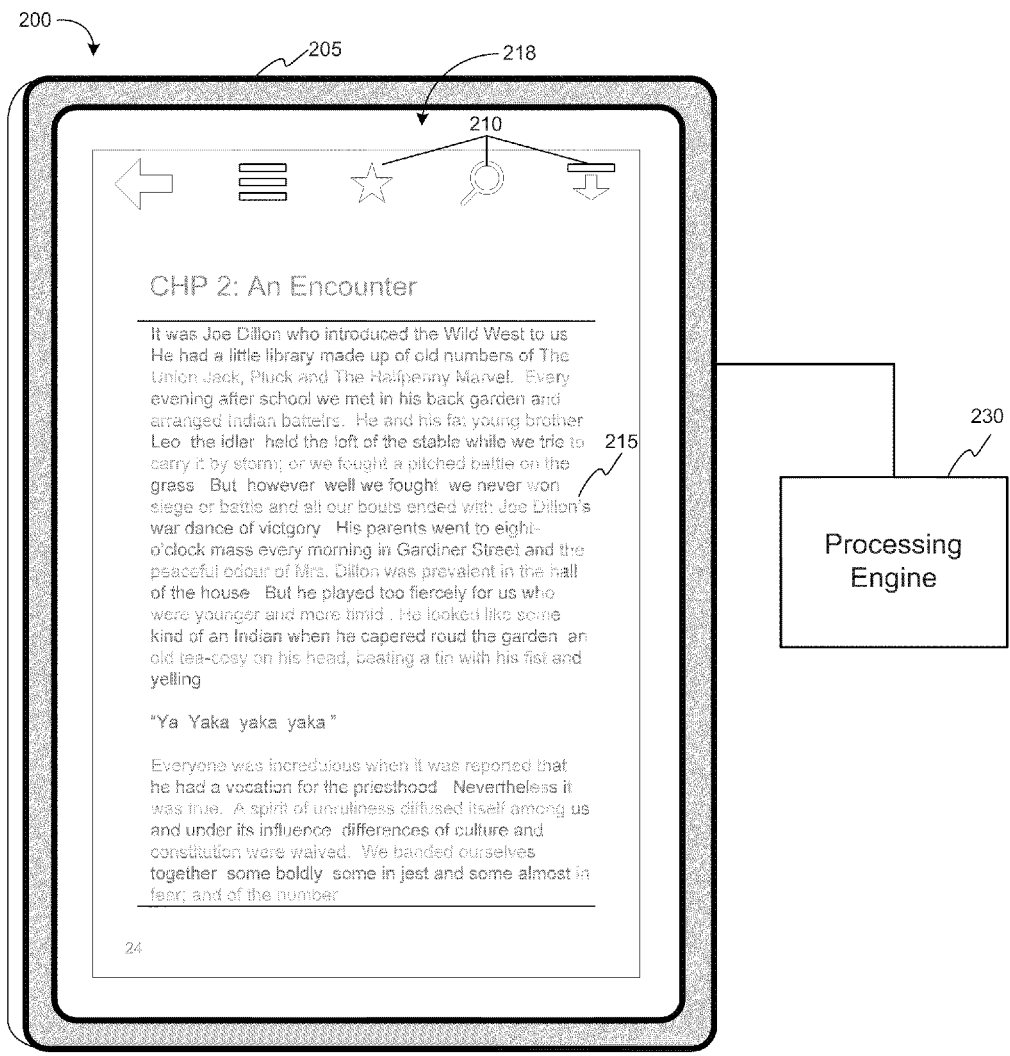
FIG. 2 is a simplified view of an electronic reading device displaying electronic content according to an embodiment of the present invention.

FIG. 2 is a simplified view of an electronic reader displaying electronic content according to an embodiment of the present invention. Electronic reader 200 includes a video display unit 205 coupled to a processing engine 230. The processing engine 230, which executes and carries out instructions of a software application, is configured to display a graphical user interface 218 on the video display unit 205 for enabling a user to skip through and interact with the displayed electronic content 215. In one embodiment, the graphical user interface 218 also includes navigation icons 210 for one touch manipulation and navigation of the electronic content 215. According to this exemplary embodiment, the displayed electronic content 215 is electronic text of an electronic book or an electronic periodical that is issued at regularly recurring intervals such as a newspaper or magazine.

Figure 3A:
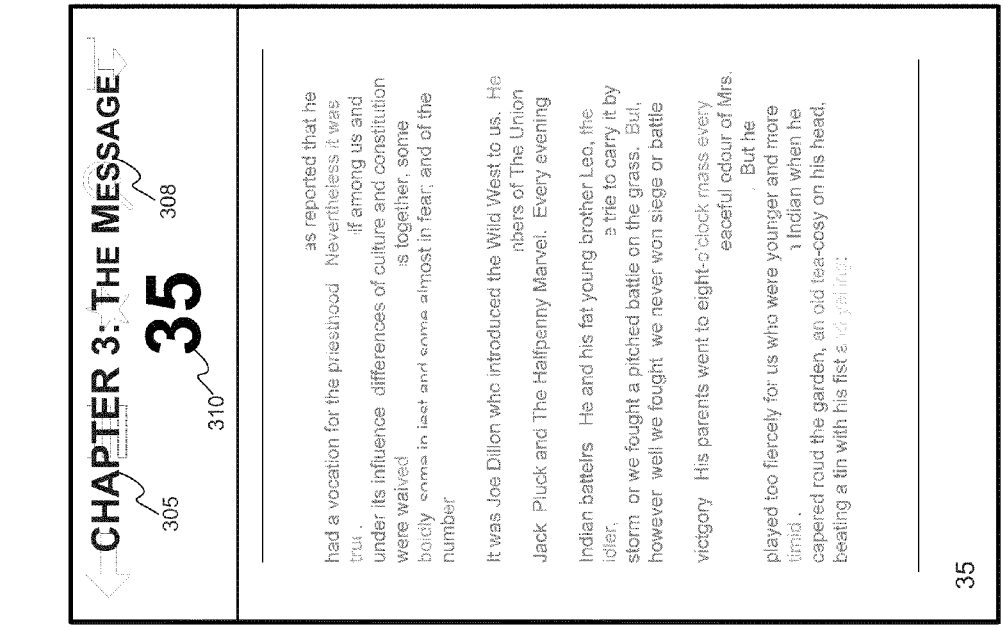
FIGS. 3A and 3B illustrate a touch-based gesture for skipping ahead to a subsequent section of electronic content according to an embodiment of the present invention.
Figure 3B:
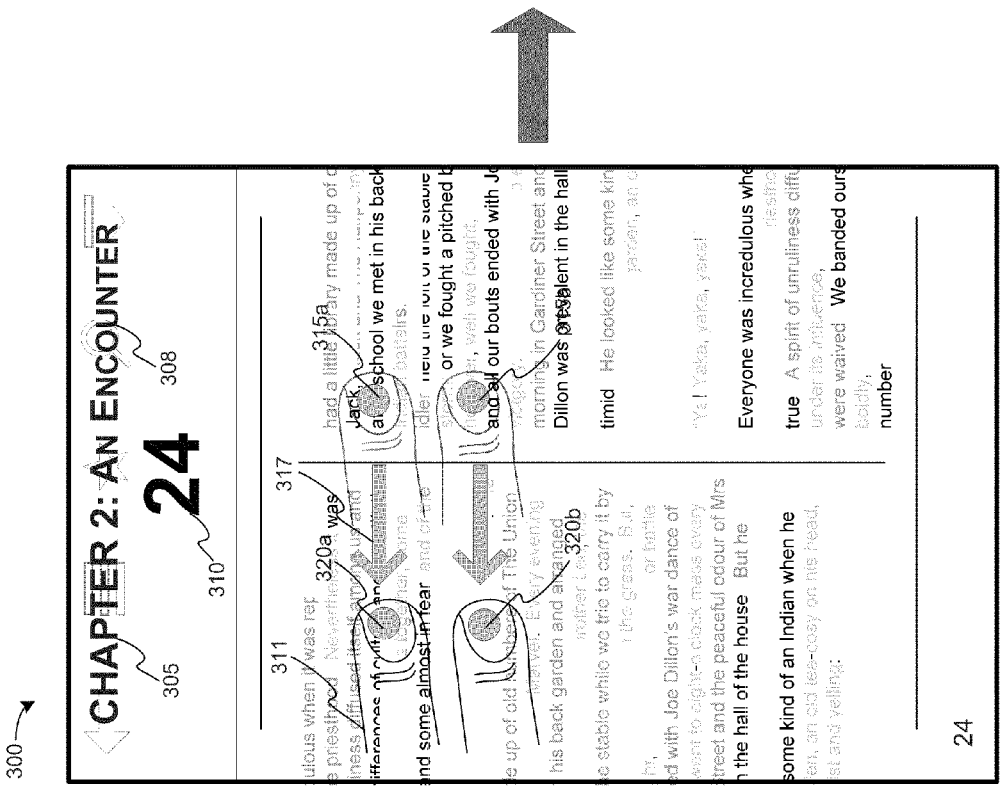

FIGS. 3A and 3B illustrate a process flow for skipping ahead to a subsequent section, chapter, or article of electronic content according to an embodiment of the present invention. As shown in this exemplary embodiment, a touchscreen gesture is received while a user is viewing a current section of digital content. In the present example, the user is viewing chapter two of an electronic book. Upon receipt of the touchscreen gesture, the current chapter 305, the current chapter title 308, and current page number 310 may be displayed on the graphical user interface. More specifically, initial touchpoints 315a and 315b represent the starting location of a multi-touch gesture, or a two-finger touchscreen gesture made by a user for example. As shown, the user's fingers 311 move simultaneously and horizontally from the right side of the display to the left side of the display, ending at touchpoints 320a and 320b. This touchscreen gesture is analyzed and registered by the processing engine, which in turn executes a section advance operation for the electronic content. Although embodiments of the present invention depict a finger as the touchscreen gesture, the invention is not limited therein. For example, the touchscreen gesture may be a stylus or similar object used for touchscreen input. That is, the touchscreen gesture may be any multi-touch input occurring at two different locations on the display screen, either optically (e.g. hover event), or physically (e.g. on-screen touch).

As shown in the exemplary embodiment of FIG. 3B, the processing engine causes the section or chapter to advance from chapter two to the beginning of chapter three, and from page 24 to page 35 of the electronic book. Moreover, this section advance operation may be accomplished while at any point in the current section. For example, the processing engine will advance the electronic content to the next section if the user is on the first page of chapter two, a middle page or area of the chapter two, or the last page of chapter two. As such, the section advance operations resulting from the user's touchscreen gesture remain consistent and reliable throughout user navigation of the electronic content.

FIGS. 4A and 4B illustrate a process flow for skipping back to a previous section of the electronic content according to an embodiment of the present invention. As shown in this exemplary embodiment, a touchscreen action is received while a user is viewing a current section of digital content. As in the previous example, the user is viewing chapter two of an electronic book. Upon receipt of the gesture, the chapter 405, the chapter title 408, and page number 410 may be displayed on the graphical user interface of the electronic touchscreen device. More specifically, initial touchpoints 415a and 415b represent the starting location of the multi-touch gesture. As shown, the user's fingers 411 move simultaneously and horizontally from the left side of the display to the right side of the display, culminating at touchpoints 420a and 420b. This touchscreen gesture is registered in the processing unit, which in turn executes a section reverse operation for the displayed electronic content.

As shown in the exemplary embodiment of FIG. 4B, the processing engine causes the section or chapter to skip back from the beginning, or first page, of chapter two to the beginning, or first page, of chapter one, and from page 24 to page 1 of the electronic book. In one embodiment, this section reverse operation varies based on where in the current section the user is viewing. If the user is viewing the first page of the current section, the section reverse operation will cause the electronic content to skip back to the first page of the previous section or chapter. As in the exemplary embodiment shown in FIGS. 4A and 4B, if the user if viewing the first page of a current section, a section reverse operation would cause the electronic content to skip back to the first page of the previous section, or chapter one in the present example. Alternatively, if the user is viewing a page other than the first page of the current section, the section reverse operation will cause the electronic content to skip back to the first page of the current section, which the processing engine recognizes as the beginning of the previous section. For example, executing a section reverse operation while the user is in the middle of chapter two, will cause the electronic content to return to the beginning of chapter two.

Figure 5:
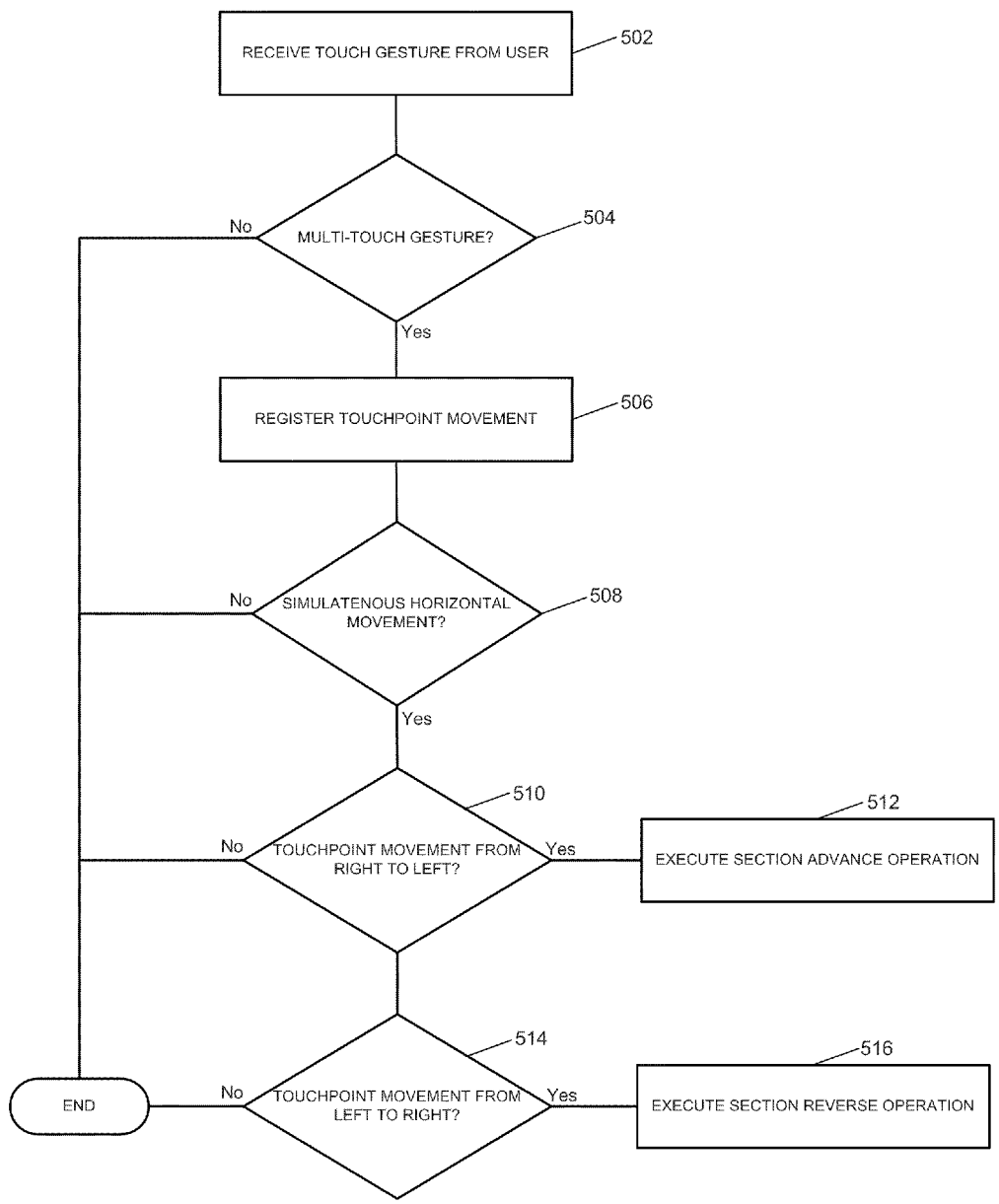
FIG. 5 illustrates the processing steps for skipping through electronic content of an electronic device according to an embodiment of the present invention.

FIG. 5 illustrates the processing steps for skipping through electronic content of an electronic touchscreen device according to an embodiment of the present invention. In step 502, a touchscreen gesture from a user is received by the electronic touchscreen device. In step 504, the processing engine determines if the touchscreen gesture was a multi-touch gesture by analyzing the initial touchpoints as described above. If the touchscreen gesture involves multiple touchpoints and therefore a multi-touch gesture, then the processing engine analyzes and measures the movement of the touchpoints during the touch event in step 506. Next, the processing engine determines, in step 508, whether the touchscreen gesture was a simultaneous horizontal touchpoint movement front one side of the display to an opposite side of the display. If it is determined in step 510 that a qualified multi-touch gesture moves from right to left, then in step 512 the processing engine immediately executes a section advance operation and skips the current section of electronic content ahead to the subsequent section, chapter, or article of the electronic periodical or electronic book. On the other hand, if it is determined in step 514 that the multi-touch gesture is a simultaneous and horizontal touchpoint movement from left to right, then in step 516 the processing engine executes a section reverse operation and either scrolls the electronic content to the beginning of the current section, or scrolls the electronic content back to the beginning of the previous section as described above.

Embodiments of the present invention enable a user of an electronic touchscreen device to use two fingers to skip through entire sections of an electronic book or periodical rather than individual pages. In one embodiment, movement of two fingers from right to left may enable a user to skip from anywhere in the current chapter to the first page of the next chapter. Conversely, a two-finger gesture from left to right may enable the user to skip from the current chapter back to the first page of a preceding chapter, or back to the first page of the current chapter.

Many advantages are afforded by the advanced skipping method for electronic content according to embodiments of the present invention. The skipping method provides an extremely responsive and engaging mechanism for user interaction with digital media. Furthermore, aforementioned two-fingered gesture allows the user to quickly skip through any particular electronic content presently being viewed. Still further, the skipping method of embodiments of the present invention has a relatively simple and quick configuration process, and therefore can be easily adopted into current electronic touchscreen devices. Accordingly, embodiments of the present invention provide an efficient and logical touch-based skipping method that can be immediately employed in today's marketplace in order to help resolve user frustration in navigating mass pages of electronic content on an electronic touchscreen device such as an e-reader.

Furthermore, while the invention has been described with respect to exemplary embodiments, one skilled in the art will recognize that numerous modifications are possible. For example, although exemplary embodiments depict an electronic reading device as the electronic touchscreen device, the invention is not limited thereto. For example, the electronic touchscreen device may be a netbook, a tablet personal computer, a cell phone, or any other electronic device configured to receive touch-based gestures and display electronic content associated with electronic media.

Furthermore, the touch-based gestures may include more than two fingers and may involve more than one hand of a user. Similarly, the touch-based gestures may move in a direction other than horizontal, such as moving vertically or diagonally across the display. Moreover, in an optical three-dimensional touchscreen environment, the multi-touch gesture may be accomplished without making physical contact with the display screen, or with an object other than a user's finger. Thus, although the invention has been described with respect to exemplary embodiments, it will be appreciated that the invention is intended to cover all modifications and equivalents within the scope of the following claims.

What is claimed is:

1. A computer-implemented method for skipping through electronic content displayed on an electronic device having a touchscreen display coupled to a processing engine, the method comprising:
    receiving, via a graphical user interface coupled to the processing engine, a multi-touch gesture from a user;
    causing, via the processing engine, electronic content associated with digital media to immediately advance to a subsequent section of the digital media or immediately reverse back to the beginning of a previous section of the digital media based on the multi-touch gesture of the user.

2. The method of claim 1, wherein the multi-touch gesture includes a movement of at least two fingers simultaneously and horizontally from one side of the touchscreen display to an opposite side of the touchscreen display.

3. The method of claim 2, wherein the electronic content is electronic text and the digital media is an electronic book or electronic periodical.

4. The method of claim 3, wherein the section is a multi-page chapter of an electronic book or a multi-page article of an electronic periodical.

5. The method of claim 4, wherein if the movement of the multi-touch gesture is from right to left, then the processing engine causes the electronic book to skip ahead from a current chapter to a chapter immediately after the current chapter.

6. The method of claim 4, wherein if the movement of the multi-touch gesture is from right to left, then the processing engine causes the electronic periodical to skip ahead from a current article to an article immediately after the current article.

7. The method of claim 4, wherein if the movement of the multi-touch gesture is from left to right, then the processing engine causes the electronic book to skip back from a current chapter to a chapter immediately before the current chapter, or the processing engine causes the electronic book to skip back to the beginning of the current chapter if the electronic book is not displaying the first page of the current chapter upon receiving the multi-touch gesture from the user.

8. The method of claim 4, wherein if the movement of the multi-touch gesture is from left to right, then the processing engine causes the electronic periodical to skip back from a current article back to an article immediately before the current article, or the processing engine causes the electronic periodical to skip back to the beginning of the current article if the electronic periodical is not displaying the first page upon receiving the multi-touch gesture from the user.

9. An electronic device comprising:
    a processing engine coupled to a touchscreen display for displaying electronic content associated with electronic media;
    a graphical user interface coupled to the processing engine and configured to process multi-touch gestures received from a user;
    wherein the processing engine is configured to advance to a next section of the electronic media or reverse back to a previous section of the electronic media based on the multi-touch gestures of the user.

10. The electronic device of claim 9, wherein the multi-touch gesture includes a simultaneous movement of at least two fingers horizontally from the one side of the touchscreen display to an opposite side of the touchscreen display.

11. The electronic device of claim 10, wherein the electronic content is electronic text and the digital media is an electronic book or electronic periodical, and
    wherein the section is a multi-page chapter of an electronic book or a multi-page article of an electronic periodical.

12. The electronic device of claim 11, wherein if the movement of the multi-touch gesture is from right to left, then the processing engine causes the electronic book to skip ahead from a current chapter to a chapter immediately after the current chapter.

13. The electronic device of claim 11, wherein if the movement of the multi-touch gesture is from right to left, then the processing engine causes the electronic periodical to skip ahead from a current article to an article immediately after the current article.

14. The electronic device of claim 11, wherein if the movement of the multi-touch gesture is from left to right, then the processing engine causes the electronic book to skip back from a current chapter to a chapter immediately before the current chapter, or the processing engine causes the electronic book to skip back to the beginning of the current chapter if the electronic book is not displaying the first page of the current chapter upon receiving the multi-touch gesture from the user.

15. The electronic device of claim 11, wherein if the movement of the multi-touch gesture is from left to right, then the processing engine causes the electronic periodical to skip back from a current article back to an article immediately before the current article, or the processing engine causes the electronic periodical to skip back to the beginning of the current article if the electronic periodical is not displaying the first page of the current section upon receiving the multi-touch gesture from the user.

16. A computer program product for skipping through electronic content of a digital media displayed on an electronic device having a touchscreen display coupled to a processing engine, the computer program product comprising:
    a computer readable storage device comprising computer usable program code embodied therewith, the computer usable program code comprising:
        computer usable program code to, when executed by a processor, receives input indicating a multi-touch gesture has been received by a user of the touchscreen display;

computer usable program code to, when executed by a processor, cause electronic content associated with the digital media to skip to another section of the digital media based on the multi-touch gesture of the user.

17. The computer program product of claim 16, in which the multi-touch gesture includes a movement of at least two fingers simultaneously and horizontally from one side of the touchscreen display to an opposite side of the touchscreen display.

18. The computer program product of claim 17, in which if the movement of the multi-touch gesture is from left to right, then the processing engine causes the digital media to skip back from a current section to a section immediately before the current section.

19. The computer program product of claim 17, in which if the movement of the multi-touch gesture is from right to left, then the processing engine causes the digital media to skip forward from a current section to a section immediately after the current section.

20. The computer program product of claim 16, in which the electronic content is electronic text and the digital media is an electronic book or electronic periodical.

* * * * *